United State
Norwich

[11] 3,727,187
[45] Apr. 10, 1973

[54] CREDIT CARD VERIFICATION SYSTEM

[75] Inventor: Daniel Norwich, Beverly Hills, Calif.

[73] Assignee: Telecredit, Inc., Los Angeles, Calif.

[22] Filed: Oct. 28, 1971

[21] Appl. No.: 193,417

[52] U.S. Cl. .............................................340/149 A
[51] Int. Cl. ...........................G05b 1/00, G06k 5/00
[58] Field of Search..................................340/149 A

[56] References Cited

UNITED STATES PATENTS

| | | | |
|---|---|---|---|
| 3,610,889 | 10/1971 | Goldman | 340/149 A X |
| 3,657,702 | 4/1972 | Stephenson, Jr. | 340/149 A X |
| 3,513,298 | 5/1970 | Riddle et al. | 340/149 A X |

*Primary Examiner*—Donald J. Yusko
*Attorney*—B. G. Nilsson et al.

[57] ABSTRACT

A credit card verification system is disclosed for use with identification cards carrying a changeable recording medium. On presentation, cards are sensed to provide signals that are indicative of the credit status of the bearer and additionally, the system senses signals to indicate that the card is being used for the first time, providing such is the case. The initial-use situation is indicated by the system (as a caution) and the card is cleared of such representations for further use. As disclosed, the initial-use signals are developed from an individual signal on the card and a specific code of the data signals.

10 Claims, 3 Drawing Figures

PATENTED APR 10 1973 3,727,187

CREDIT CARD VERIFICATION SYSTEM

BACKGROUND AND SUMMARY OF THE INVENTION

Various forms of identification cards or credit cards have come into exceedingly widespread use to designate the owner as a person to whom credit may be extended. These cards have been successful largely because they enable the owner to avoid carrying significant amounts of cash. However, the use of the cards and similar devices has not been without certain attendant difficulties. For example, the owner of a credit card may become irresponsible due to financial losses, whereupon he may incur a large indebtedness based upon his credit card, which indebtedness may not be recoverable. To avoid such an occurrence, it has been proposed to incorporate a recording medium in credit cards for use in cooperation with a system to provide a basis for exercising some control over the use of the card. One form of such a system is disclosed in U.S. Pat. No. 3,610,889, granted Oct. 5, 1971, to R. N. Goldman and entitled Identification-Card Control System.

Although systems as identified above may be very helpful in limiting credit-card losses, another difficulty arises in relation to lost or stolen cards. That is, in the event a card comes into the possession of an unauthorized bearer, large purchases may be supported by the card and generally either the owner of the card or the issuing organization incurs a substantial loss.

Generally, it has been determined that a period of considerable danger in the life of a credit card exists between the time it is produced and the time when it is accepted by an owner. For example, large numbers of credit cards are sometimes stolen from a carrier while in transit to the intended bearers. Unsolicited credit cards are particularly vulnerable to interception and fraudulent use. Accordingly, it has been determined that an important criteria in the verification of credit cards relates to determining that such a card has reached the proper person. In general, in accordance with the present invention, a system is provided for use in cooperation with credit cards bearing recorded signals, to indicate no prior use. The system, accordingly, indicates the occurrence of a card being initially used, so that supplemental identification may be required or other verification steps employed.

BRIEF DESCRIPTION OF THE DRAWING

In the drawing, which constitutes a part of this specification, an exemplary embodiment demonstrating various objectives and features hereof is set forth, as follows.

DETAILED DESCRIPTION OF THE ILLUSTRATIVE EMBODIMENT

As required, a detailed illustrative embodiment of the invention is disclosed herein. The embodiment merely exemplifies the invention which may, of course, be constructed in accordance with various other forms, some of which may be somewhat different from the disclosed illustrative embodiment. However, specific structural and functional details disclosed herein are merely representative and in that regard, provides a basis for the claims herein which define the scope of the invention.

Figure 1:
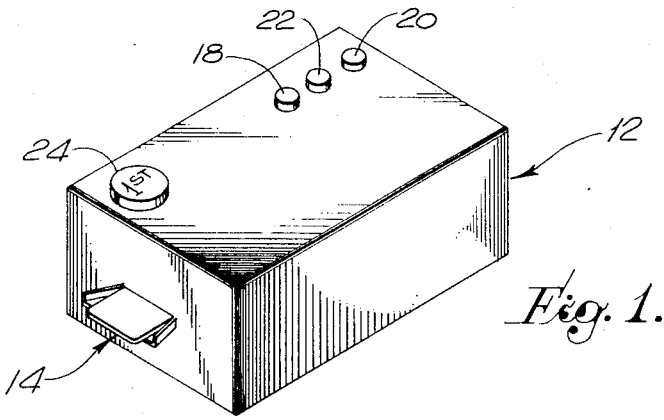
FIG. 1 is a perspective view of a unit incorporating the system of the present invention.

Referring initially to FIG. 1, a unit 12 of the present invention is shown receiving a cooperating identification card 14 for evaluation. The unit 12 may, of course, incorporate various specific structures as disclosed in the above-referenced patent; however, in general, if the system determines that the transaction is to be authorized, a green lamp 18 is illuminated. On the contrary, a red lamp 20 indicates rejection and a yellow lamp 22 indicates caution. In the event that the credit card 14 is presented for the first time, a lamp 24 is illuminated indicating "1$^{st}$" instance of use. In the latter situation, the person using the unit 12 is alerted to require supplemental identification as a driver's license or the like or to take other cautions as in verifying signatures, checking card lists or so on, depending upon individual policies.

Figure 2:
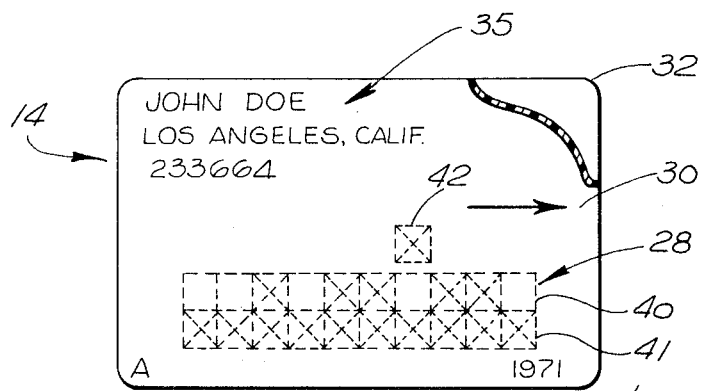
FIG. 2 is a plan view of an identification or credit card suitable for use in cooperation with the unit of FIG. 1.

The identification device or card 14 may take a wide variety of different forms and the detailed configuration represented in FIG. 2 is merely illustrative. The card 14 comprises a laminated, embossed plastic material having a strip 28 of magnetic recording medium e.g. fine iron oxide particles, sandwiched between plastic laminations. Specifically, as shown in FIG. 2, an upper lamination 30 is bonded to a lower lamination 32 with the strip 28 therebetween. The upper section 34 of the card receives embossed letters 35 identifying the owner by name, address and account number, for example.

The information recorded by the magnetic strip 28 is not humanly perceivable and if desirable, the strip can be concealed by making the laminations 30 and 32 opaque. However, the strip 28 is indicated in phantom in FIG. 2 to indicate two data-recording channels 40 and 41 as well as a single-bit recording location 42. Generally, the channel 40 serves to provide data indicative of a card bearer or the status of the card as used. Channel 41 provides clocking signals for the channel 40, and the space 42 serves to record a binary bit indicative of the fact that the card has not been previously used.

Considering a specific example, the channel 40 may record binary signals representative of the month when the card was last used to support a transaction as well as an aggregate amount of transactions supported by the card during that month. Of course, various codes may be employed as set forth in the above-referenced Goldman patent to indicate time, monetary value or other data. As disclosed in detail in the above-referenced Goldman patent, data is sensed from the card 14 and processed to provide an indication of the status of the card. Specifically, if the card represents a good account, as nearly as can be determined, the green lamp 18 is illuminated. Otherwise, either the yellow lamp 22 (indicating caution) or the red lamp 20 (indicating disapproval) is illuminated. Of course, various detailed structures may be provided in the unit 12 to selectively illuminate one of the lamps 18, 20 or 22 on the basis of data sensed from the card 14. Alternatively, other status-indicator structures may be employed.

Figure 3:
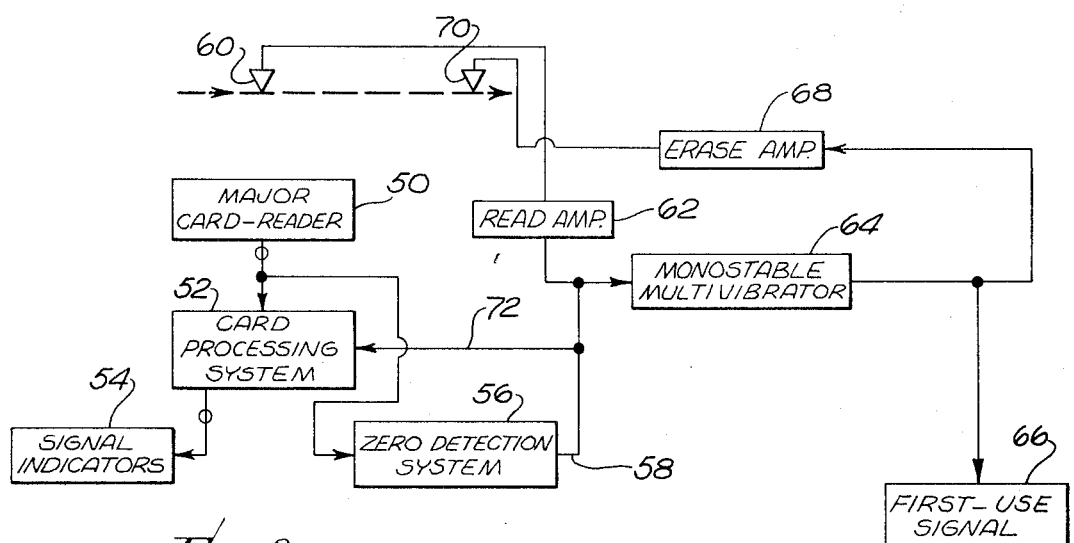
FIG. 3 is a schematic and diagrammatic representation of an electrical system as incorporated in the structure of FIG. 1.

Considering the operation of the unit of FIG. 1, with reference to FIG. 3, a major card-reader 50 senses the channels 40 and 41 (FIG. 2) of the card and provides the resulting data signals to a card processing system 52. The system 52 may variously process the signals, by making comparisons or performing other operations as disclosed in detail in the above-referenced Goldman patent, to selectively energize one of the lamps 18, 20 or 22 (FIG. 1) as collectively represented by a block 54 in FIG. 3.

As indicated, the detailed structure of the card reader 50, the system 52 and the indicators 54 may be in accordance with the disclosure set forth in the above-referenced Goldman patent, and in that regard, it is to be noted that a unique code for the data in the channel 40 (FIG. 2) represents "zero". That is, the code for "zero" is not otherwise assigned. Specifically, the presence of all "zeros" as the binary bits in the channel 40 is one of the indicators that a card has not been previously used.

In the course of operation, sets of data signals that are sensed from the card 14 by components of the reader 50, are also applied to a zero-detection system 56 which is a code detection structure. On receipt of a set of binary signals all of which represent "zero", the system 56 simply provides a high-level signal to a conductor 58. Generally, detectors for various numerical representations or values of binary code are well-known in the prior art and such structures may be readily employed as the system 56. The output from the system 56 to the conductor 58 is applied to the card processor 52 and to set a monostable multivibrator 64, the operation of which will be described in detail below.

In addition to the major card reader 50, a read head 60 (FIG. 3) is provided to communicate with the single-bit space 42 (FIG. 2) on the card 14 as the card passes through the unit 12 (FIG. 1). In the event that a binary "one" is recorded in the space 42, a high "one-bit" signal is sensed by the head 60, amplified by an amplifier 62 and applied to set the monostable multivibrator 64. The conductor 58 is also connected to the monostablle multivibrator 64 so that the multivibrator is placed in a set state upon the occurrence of a zero value being represented by the data signals in channel 40 and/or a "one" being recorded in the space 42. Thus, either the special "first-use" zero code in channel 40 or the "first-use" bit from the space 42, will set the multivibrator 64.

As well known, when placed in a set state, the monostable multivibrator 64, in accordance with conventional operation provides the high level of a binary signal for a timed interval, which signal is applied to illuminate the "1$^{st}$" lamp 24 (FIG. 2) as represented by the block 66 (FIG. 3). The signal from the multivibrator 64 is also applied to an erase amplifier 68 which energizes an erasing magnetic head 70 to clear the recorded "one" from the space 42 (FIG. 2). In view of the above structural description of the system, typical operating sequences will now complete an understanding of the illustrative embodiment.

Generally, in accordance herewith, newly-issued credit cards 14 will have a binary "one" digit recorded in the space 42 and will have only "zeros" recorded in the channel 40. Upon presentation of such a card for the first time, the "one" digit is sensed by the head 60 (FIG. 3) to actuate the monostable multivibrator 64. Somewhat concurrently, the monostable multivibrator 64 is also actuated by the system 56 detecting the presence of all "zeros" in the channel 40. As a consequence, a prolonged pulse is provided by the monostable multivibrator 64, to acuate the first-use signal 66 which incorporates a lamp 24 (FIG. 1). Somewhat concurrently, the signal from the multivibrator is applied through the erase amplifier 68 causing the erase head 70 to clear the "one" recorded in the space 42 (FIG. 2). During the operation, the card processing system 52 records current data in the channel 40 as described in the above-referenced Goldman patent to eliminate the set of zeros from the channel.

Upon the illumination of the 1$^{st}$ use bulb 24, or other structure as represented by the signal 66, the operator of the unit is alerted to the fact that the card has not previously been presented and, accordingly, it is important to confirm that the card has reached the person identified thereby. Accordingly, supplemental identification may be requested on the initial presentation to confirm that the bearer is proper.

It is to be recognized that persons may acquire credit cards prior to delivery and tamper with them with the objective of removing the "first-use" signals. Accordingly, it may be desirable to utilize various complicated coding techniques or other means. In that regard, a feature of the illustrative embodiment is pertinent. As indicated above, if the data in the channel 40 does not decode into intelligence, a yellow lamp 22 (FIG. 1) is illuminated. Generally, as the presence of all "zeros" in the channel 40 is not representative of any code, the lamp 22 might otherwise be illuminated. However, the signal applied to the multivibrator 64 is also applied to the card processing system 52 through a conductor 72. Accordingly, upon the presence of a high signal in the conductor 72, the illumination of the lamp 22 is inhibited. Thus, note that if a person tampering with the card (seeking to change the "first-use" coding) accomplishes any meaningless code in the channel 40, such an occurrence will be detected when the card processing system 52 (FIG. 3) energizes the yellow lamp 22 (FIG. 1).

Of course, various schemes may be employed to increase the difficulty of making unauthorized modifications to the card 14 in order to eliminate the "first-use" code. Generally, a wide variety of code techniques are well known in the prior art so that adaptation hereto would be obvious to one skilled in the art. However, the important consideration resides in the provision of a code-detection means in the unit 12 which in turn functions to energize a signal device manifesting the fact that the card has not been previously used. In view of the wide variety of codes which might be employed, emphasis is placed upon the claims set forth below which are definitive of the scope of the present invention.

What is claimed is:

1. A processing system for use with credit cards or the like, which include a changeable recording medium, comprising:

signal means for manifesting the first use of a credit card;

means for sensing a signal from said recording medium to indicate the first use of the card, for actuating said signal means;

and means to change said recording medium on said card to remove therefrom said signal to indicate the first use of the card.

2. A system according to claim 1 wherein said means for sensing includes magnetic head means for sensing said signal to indicate first use from said card.

3. A system according to claim 2 wherein said means to change said recording means includes at least one magnetic erase means.

4. A system according to claim 3 wherein said magnetic erase means is actuated upon the actuation of said signal means for manifesting the first use.

5. A system according to claim 1 wherein said means for sensing includes means for sensing a plurality of recorded signals from said card, and means for decoding said signals to provide said signal to indicate the first use of the card.

6. A system according to claim 1 further including means for sensing data signals from said cards indicative of the status thereof regarding prior transactions; and means for manifesting said status.

7. A system according to claim 6 further including means for manifesting the situation when said data signals are not logical providing said signal to indicate the first use of the card is not sensed.

8. A system according to claim 7 wherein said means for sensing data signals includes magnetic head means.

9. A system according to claim 8 wherein said means to change said recording means includes at least one magnetic erase means.

10. A system according to claim 9 wherein said magnetic erase means is actuated upon the actuation of said signal means for manifesting the first use.

* * * * *